May 26, 1959 — G. E. KLOOTE ET AL — 2,887,732
ATTACHMENT MEANS FOR LAMINATION PANELS
Filed Feb. 2, 1956

INVENTORS
JOSEPH A. POTCHEN
GEORGE E. KLOOTE
GEORGE D. MEIER
BY
ATTORNEY

United States Patent Office 2,887,732
Patented May 26, 1959

2,887,732
ATTACHMENT MEANS FOR LAMINATION PANELS

George E. Kloote, Grand Rapids, Joseph A. Potchen, Marne, and George D. Meier, Grand Rapids, Mich., assignors, by mesne assignments, to Haskelite Manufacturing Corporation, a corporation of Delaware Application February 2, 1956, Serial No. 562,973

8 Claims. (Cl. 20—4)

This invention relates to a means of attaching together two angularly disposed, laminated panels made entirely or largely of synthetic resin material, particularly those having a low density core and a hard facing sheet.

Serious trouble sometimes occurs in joining two laminated panels at an angle to each other. This is especially true when the panels are fabricated of a hard facing and a core of a low density material, such as a foamed polystyrene, foamed phenolic or a foamed polyisocyanate. Such core material is comparatively weak in tension. As a result, the facing sheet may peel off, especially if an edge of the sheet works loose or an object hooks under the edge. This type of core material normally is not hard and readily permits penetration by a sharp object. Thus, it allows an object to hook under the facing sheet once an opening is exposed.

Where the core does not contain one or more lamina of wood or other hygroscopic material, the problem of damage resulting from objects becoming hooked under the edge of the facing sheet is not quite so critical. But, the exposure of a hygroscopic sublamina to moisture resulting from an opening or loose edge is detrimental. The moisture in the sublamina may cause the facing to peel off. It may also cause deterioration and warpage of the wood.

Another important consideration in attaching two laminated panels is that any exposure of the core or peeling of the facing gives the structure an undesirable appearance. Thus, it is conventional to cover the joints between the two panels with a batting strip or stripping tape. This is undesirable because it destroys the smooth and continuous effect of the joint. Further, the stripping tape, itself, may peel off.

It is the object of this invention to provide a means of attaching at an angle two panels, each of said panels being formed of a low density core and a hard facing sheet.

Another object of this invention is to provide a means and a method of joining such panels together so as to give a neat and smooth appearance, while at the same time providing a joint highly resistant to wear, shock, and mechanical injury.

Still another object of this invention is to provide a laminated panel corner construction including two panels disposed at an angle to each other and each having a core with a facing sheet secured to the core at the inner sides of the angle formed by the panels. The two panels are secured to each other so as to give a neat appearance. At the same time, a strong joint is formed resistant against peeling of the facing sheets and breakage of the joint.

These and other advantages and objects of our invention will become obvious to one skilled in the art of synthetic laminated panels upon reading the following specification in conjunction with the accompanying drawings wherein.

Figures 1, 2, 3, 4:
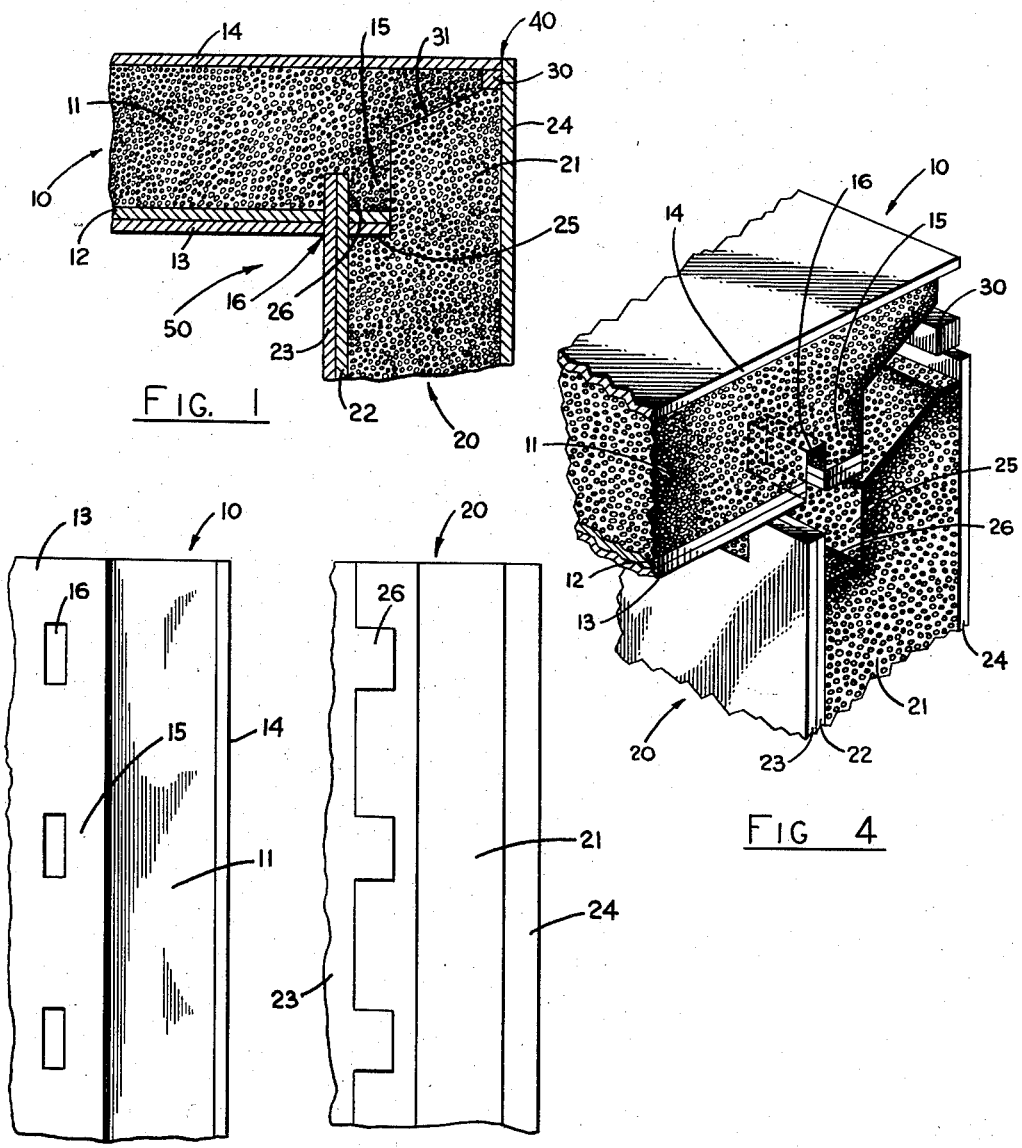
Fig. 1 is a fragmentary, sectional view of two synthetic resin panels joined together in accordance with this invention.
Fig. 2 is a fragmentary view of the edge of one of the panels.
Fig. 3 is a fragmentary, side view of the edge of the other panel.
Fig. 4 is an oblique, fragmentary, exploded view of the two panels.

Briefly, this invention is concerned with a means and a method for attaching two laminated panels together at an angle to each other. The two panels are each fabricated of a body or core of fill material and at least one facing sheet is secured to the body at the inner sides of the angle formed between the panels. The inner corner construction includes one of the panels having blind holes extending through its inner sheet and into its core. The other panel has protrusions on the edge of the inner facing sheet. These protrusions are inserted into the holes. The outer corner construction includes a bead of adhesive located in a cavity cut out of the corner and extending under the outer facing sheets of the panels. These outer facing sheets are adhesively bonded to the bead as well as to the adjacent surface of the core. The adjacent remaining portions of the edges of the panels at the joint are shaped to fit each other and are secured together by an adhesive or other suitable bond.

Throughout this description, the words "inner" and "outer" shall be taken to mean "inner" toward the inside of the enclosed angle formed by the intersection of the two panels, and "outer" indicates the exterior angle.

Referring specifically to the drawings, the numerals 10 and 20 each denote a laminated panel. The panel 10 has a low density core 11, an inner facing skin 13 and a sublamina 12, and the outer facing skin 14. Panel 20 is similarly constructed and includes the core 21, an inner facing skin 23 and a sublamina 22 and outer sheet 24. The panels 10 and 20 are joined to each other at an angle.

The cores 11 and 21 may be of any suitable type of light weight, low density, cellular material. One such material is a foamed polystyrene such as those made by polymerizing a hydrocarbon or halohydrocarbon having a vinyl radical or an aromatic nucleus and includes the products resulting from polymerization of styrene, monomethylstyrene, vinyl naphthalene and the halogenated styrenes. Such foamed core material normally has a density in the range of two to ten pounds per cubic foot. The core may be of a foamed in situ reaction product of a polyisocyanate and a suitable polyester or alkyd resinous composition. An example of such a polyisocyanate is a meta-toluene-diisocyanate. This latter is but an exemplification because other aromatic polyisocyanates can be employed quite satisfactorily. The foamed phenolics, of which there are various types, may also be employed for this purpose. Such light weight, foamaceous, core materials have rather poor resistance to tension loading. Thus, if one end of the facing sheet can be gripped and pulled back it will have a tendency to rip loose from the core by tearing the core adjacent the bond between the facing sheet and the core.

The inner facing sheets of the panels are made of either one or two layers. Preferably, two layers are used, consisting of an inner lamina 12 and 22 of plywood or hardboard or other similar materials including ligneous and mineral fiber materials bonded by synthetic resin or cementitious binders secured to an outer skin 13 and 23. The skins 23 are of a hard, impervious resin material which may be securely bonded to the sublaminae or core material by a suitable resin of adhesive properties in which neither the facing sheet, the sublaminae, or core are readily soluble. A suitable resin for manufacture of the skins is any one of the numerous, commercially available, polyester resins. The resin is normally reinforced with a fibrous material such as filamentary glass in which the filaments are either oriented or arranged at random. When cured, they have a thickness normally within the range of 0.015 to about 0.060 of an inch. The sublaminae 12 and 22 may be of the same thickness or they may be of different thicknesses depending upon the particular requirements of the installation in which the panel is to be used.

It will be recognized that this invention may be practiced with panels having no inner sublamina or no inner surface skin. It may also be practiced with panels having more than two inner sublaminae.

The outer facing sheet is illustrated as consisting of one lamina of material similar to or exactly the same as the material of the skins 13 and 23. This facing sheet may also consist of two laminae including a sublamina of hardboard, plywood or like material and a surface skin of reinforced, synthetic resin.

When two lamina are utilized as either inner or outer facing sheets, the lamina may be bonded together previously to assembling the entire panel; or the lamina can be bonded together during one complete assembly of the panel. In either case the laminae may be bonded together and the facing sheets suitably bonded to the core with an epoxy resin adhesive hardenable at ambient or moderately elevated temperatures and under only sufficient pressure to assure firm contact between the elements during the curing period. This adhesive is the liquid, partially polymerized, high molecular weight, reaction product of a diphenyl and an epoxy compound. One example of such a reaction product is that obtained by heating together 2,2''-bi(4-hydroxyphenyl propane) and epichlorhydrin in the presence of an alkali such as sodium hydroxide, whereby there are formed polymeric glycidyl polyethers of the phenolic substance having properties and an average molecular weight depending upon the reaction conditions and the proportions of reactants employed. This is merely an example of one particular adhesive and it will be recognized that various other materials may be used without in any way affecting this invention.

For the purpose of bonding together the various laminae making up the panels 10 and 20, contact resins may be used as substitutes for the epoxy type adhesive resins. The contact resins used for this purpose must be of a type which will adhere strongly to themselves even after evaporation of the carrier whether it is water or a solvent.

Among suitable contact type adhesives for this purpose is D-253-20 sold by Armstrong Cork Company. This is a synthetic rubber base material containing a solvent and methyl-ethyl-ketone. Another suitable contact adhesive is EC-971 sold by Minnesota Mining and Manufacturing Company. The latter is a water dispersion type of adhesive. Other usable contact adhesives include Nos. 971, 871 and 321 all sold by Minnesota Mining and Manufacturing Company. These are water dispersion adhesives. Also usable is Minnesota Mining and Manufacturing Company's solvent carrier contact adhesive EC-1390. These are but exemplary of the contact adhesives which may be used for this purpose.

These panels are normally made by first fabricating the facing skins as hard, continuous lengths of flexible material. By suitable equipment, the facing sheets are bonded one to each side of the core material. In the case of a foamed-in-place type material, the facing sheets are placed in a suitable machine and the core material foamed between them. Most foamed-in-place polyisocyanate materials do not require an adhesive since the core material itself acts as the bonding agent to the facing sheets. The panels, as they leave the panel forming process, each have at least one exposed edge where they can be joined together.

It will be recognized that although there are shown on the inner face of each panel both a skin and a sublamina, a single lamina will work satisfactorily. Also, while these panels are normally manufactured with facing sheets on both sides, they may be fabricated with one on the inner side only. Various combinations of laminae of this type may be made without interfering with the practice of this invention. This invention is applicable to any of these forms.

An exposed edge of each panel is shaped and prepared for attachment to the complementary edge of the other panel to which it is to be joined. This shaping and preparation can be accomplished by cutting away portions of an existing square edge, or the shape of the edge can be formed by a mold or otherwise. It has been found that the preferred procedure is to form square edged panels and cut-out portions of the edge to form the desired joint. Both the facing sheets and the cores can be cut and removed by any suitable equipment such as a router.

In forming the joint illustrated in Figs. 1 and 4, two different joints are used, one at the outer corner 40 and the other at the inner corner 50. At the outer corner 40, the core material is cut out of each panel at the point of juncture of the outer facing sheets 14 and 24. Thus, in fitting the two edges together a pocket is created. This pocket is filled with a bead 30 of adhesive material of a type impervious to moisture. The bead 30 adheres strongly to the core material 11 and 21 of each panel and the outer facing sheets 14 and 24. This provides a firm anchor at the corner for the sheets 14 and 24. The epoxy type adhesives are particularly suited to the formation of the bead 30. The bond formed between the epoxy type resins and the polyester type facing sheets is not subject to delamination under normal mechanical injury. Such a bead is not readily subject to cracking even under heavy impacts. The force created by sharp, downward blows on the corner at the edge of sheet 24 will be distributed to the facing sheet 14 and transmitted to the cores in shear. Since the bonds between the facing sheets and the cores are highly resistant to shear loads, the weakness of the bond under tension loading is avoided. For this reason, it is important that the bead 30 extend a short distance (from .2 to .5 inches) back under both sheets 14 and 24. This feature is similar to the corner construction forming the subject matter of our co-pending application Serial No. 522,942, filed July 19, 1955, which has now matured into U.S. Patent No. 2,826,240, issued March 11, 1958. It will be recognized that the bead 30 may be reinforced by filamentary material such as glass. This will further add to its strength.

The inner corner construction 50 includes the cut out portion or cavity 25 in the edge of panel 20. Panel 10 has an overlapping portion 15 having the same shape and size as the cavity 25 and designed to nest in such cavity 25 (Fig. 1). Located along the juncture of the inner facing sheets of the panels are a plurality of blind holes 16 extending through the skin 13, the sublamina 12 and into the core 11. The depth of these holes is sufficient to receive the end tenons or protrusions 26 along the edge of the facing sheet 23 and the sublamina 22. The tenons 26 are of the same cross sectional shape and size as the holes 16 and are spaced to fit into the holes 16. In the preferred form, holes 16 and tenons 26 have a rectangular cross section and are of such depth and such spacing as will provide a rigid connection between the panels. The tenons 26 are secured in the holes 16 preferably by an adhesive such as an epoxy type resin. The bottom wall of the cavity 25 is bonded to the overlapping portion of the facing sheet 13 by the same or a similar adhesive.

The remaining portions of the edges of panels 11 and 21 have configurations such that the two abut one another. The edges are bonded together by an adhesive such as an epoxy resin to form the glue line 31. This glue line is preferably extended upwardly in a somewhat parallel direction to facing sheets 23 and then diagonally to the outside corner 40. This provides a greater area of bond between the panels than would a straight glue line extending directly to the corner 40.

This entire arrangement of the inner corner construction provides a firm anchor at the inner corner for the inner facing sheets. Any force exerted on the interlocking inner facing sheets tending to peel these sheets from the cores is transmitted to the cores in shear rather than in tension. Since the bond between the facing sheets and cores has low resistance to tension loads and high resistance to shear loads, the strength of the joint is markedly increased. The interlocking facing sheets also prevent the edges of the facing sheets from being hooked by sharp objects. Since the entire edge of the inner facing sheet of panel 10 extends into the core material, it is impossible to hook the inner edge of panel 10. It is also impossible to hook portions of the inner edge of panel 20.

The strength of the joint is increased by the inner corner construction. In conventional inner structures, a force tending to part the joint exerts a force in tension to the cores. This corner construction by means of the bond between the facing sheets of overlapping portion 15 and cavity 25 and the bond between tenons 26 and core 11 transmits the force on the cores to shear. Since the cores are much more resistant to shear loads than tension loads, the joint is much stronger than conventional joints.

The invention also has the advantage of permitting the use of wood without danger of warpage due to moisture contacting the wood. The resin facing skins 13 and 23 cover all normally exposed areas of panels having wood sublaminae. This protective covering permits the use of wood with its high strength to weight ratio while at the same time protecting the wood from moisture in the surrounding atmosphere.

The use of the mortise and tenon type of interlock for the inner facing sheets provides a means of automatically aligning the panels. The interfitting of the parts eliminates the use of jigs or other alignment means since they act in a manner similar to dowel or guide pins.

It will be seen that we have provided a strong and secure means for attaching two panels at an angle to each other. In its broadest aspect this invention applies only to the inner corner construction 50. In this respect the outer corner construction can be varied without departing from the spirit of this invention. In this respect, the corner joint may be used between panels having no outer facing sheets of any type. In the narrower aspect, this invention applies to the combination inner corner construction 50 and outer corner construction 40. Both of these constructions contribute to the strength of the entire panel corner structure.

While we have described a preferred embodiment of our invention, it should be understood that other forms and embodiments can be made without departing from the principles thereof. Such modifications are to be considered as included in the hereinafter appended claims unless these claims by their language expressly state otherwise.

We claim:

1. A corner construction which attaches two laminated panels disposed angularly to each other, each said panel having a cellular core and a facing sheet secured to each side of said core, which comprises a first panel having a plurality of aligned apertures spaced from the end extremity of said panel and extending through one of said cover sheets and a part of said core, a second panel having a substantially rectangular cavity in the core thereof disposed immediately adjacent to a cover sheet and extending parallel thereto across the width of said panel and a plurality of spaced apertures in the cover sheet adjacent to said cavity, the apertures in said cover sheet defining a plurality of tenons which are spaced and sized so as to fit into and fill the said apertures in said first panel, and said panels in angular engagement such that the extreme end portion of said first panel lies in and fills the said rectangular cavity in said second panel and the said tenons of said second panel fill the aligned apertures in said first panel.

2. A corner construction for attaching two substantially flat laminated panels to form a right angle, each said panel having a low density cellular core and higher density facing sheets secured to each side surface of said core, a cavity in the core of each said panel immediately adjacent to the outer facing sheets of each said panel, said cavity extending across the width of said panel and for a distance inwardly from the edge extremities of said facing sheets, the first of said panels having a cavity immediately adjacent to the inner cover sheet extending across the width of said panel and for a distance inwardly from the inner surface of said inner facing sheet and for a substantial distance parallel to the surface of said facing sheet thus defining a substantially rectangular cavity in said core, the inner edge surfaces of the said cavity adjacent said outer and said inner cover sheets being joined by a planar, diagonally disposed surface, and the second of said panels having its inner end surface contoured to complement the core surface of said first panel when said panels are placed in abutment.

3. A panel in accordance with claim 2 wherein the said cavity adjacent to the said outer facing sheets is filled with a bead of shock resistant adhesive, and all contacting surfaces of said cover sheets and said cores are adhesively bonded together.

4. A corner construction in accordance with claim 2 wherein said first panel is provided with a plurality of aligned apertures spaced from the end extremity of said panel and extending through one of said cover sheets and a part of said core, and said second panel is provided with a plurality of spaced apertures in the cover sheet adjacent to said cavity, the said cover sheet apertures defining a plurality of tenons which are spaced and sized to fit into and fill the said apertures in said first panel when said panels are placed in abutment.

5. In an inner corner construction for attaching a first laminated panel to a second laminated panel, said panels being disposed at an angle to each other, said laminated panels each having a body of low density, cellular, synthetic resin fill material and at least one high density facing sheet secured to said body at the inner sides of the angle formed by the panels thereby forming two adjacent edges, the improvement comprising: a second panel having a cut out portion in said facing sheet and in the immediately adjacent low density, cellular, synthetic resin fill material of said edge of said second panel, a portion of said first panel fitted into said cavity, said first panel having a plurality of holes at the juncture of said facing sheets of said panels, said holes extending through said facing sheet and into said body of said first panel, protrusions on said facing sheet of said second panel extending into said holes and adhesively secured to said fill material of said first panel, said facing sheet of said first panel being adhesively bonded to said fill material of said second panel; the adjacent edges of said bodies of low density, cellular, synthetic resin fill material being shaped to fit against each other, and said edges of said bodies being secured to each other.

6. A corner construction for attaching a first laminated panel to a second laminated panel, said panels being disposed at an angle to each other, said laminated panels each having a body of fill material and facing sheets secured to said body at the inner sides and the outer sides thereby forming two adjacent edges, which comprises an inner corner construction having blind holes in said first panel spaced from said edge of said first panel and extending through said facing sheet and into the body of said first panel, protrusions on said edge of the facing sheet of said second panel and extending beyond the immediately adjacent fill material of said second panel, said protrusions being of substantially the same size and shape as said holes, received therein and adhesively secured to the fill material of said first panel, the adjacent edges of said bodies of fill material being shaped to fit against each other, said edges of said bodies being secured to each other, and an outer corner construction having a cavity in said outer corner of said fill material immediately adjacent said outer facing sheets, said cavity extending a distance toward the center and along the edge of said sheets and said cavity being filled with a bead of shock resistant adhesive bonded to said cores and to said outer facing sheets.

7. In a corner construction for attaching a first laminated panel to a second laminated panel, said panels being disposed at an angle to each other, said laminated panels each having a body of fill material and facing sheets secured to said body at the inner sides and the outer sides thereby forming two adjacent edges, the improvement comprising an inner corner construction in which said edge of said second panel has a cavity in said facing sheet and in the immediately adjacent fill material, a portion of said first panel fitted into said cut out portion, said first panel having a plurality of holes spaced along the juncture of said facing sheets of said panels, said holes extending through said facing sheet and into said body of said first panel, protrusions on said facing sheet of said second panel extending into said holes and adhesively secured to said fill material of said first panel, and said edges of said bodies being secured to each other, and an outer corner construction comprising said outer corner of said fill material having a cavity immediately adjacent said outer facing sheets, said cavity extending a distance toward the center and along the edge of said sheets, and said cavity being filled with a bead of shock resistant adhesive bonded to said cores and to said outer facing sheets.

8. In a corner construction for attaching a first laminated panel to a second laminated panel, said panels being disposed at an angle to each other, said laminated panels each having a body of low density, cellular, synthetic resin fill material and facing sheets secured to said body at the inner sides and the outer sides thereby forming two adjacent edges, the improvement comprising: an inner corner construction comprising said edge of said second panel having a cavity in said facing sheet and in the immediately adjacent low density, cellular, synthetic resin fill material, a portion of said first panel fitted into said cut out portion; said first panel having a plurality of holes spaced along the juncture of said facing sheets of said panels, said holes extending through said facing sheet, and into said body of said first panel, protrusions on said facing sheet of said second panel extending into said holes and adhesively secured to said fill material of said first panel, and said edges of said bodies being secured to each other, and an outer corner construction comprising said outer corner of said low density, cellular, synthetic resin fill material having a cavity immediately adjacent said outer facing sheets, said cavity extending a distance toward the center and along the edge of said sheets, and said cavity being filled with a bead of shock resistant adhesive bonded to said cores and to said outer facing sheets.

References Cited in the file of this patent
UNITED STATES PATENTS

| | | |
|---|---|---|
| 171,326 | Stearns | Dec. 21, 1875 |
| 372,694 | Mergott | Nov. 8, 1887 |
| 388,760 | Clement | Aug. 28, 1888 |
| 998,086 | Goehler | July 18, 1911 |
| 1,308,372 | Rockwell | July 1, 1919 |
| 1,533,099 | Carroll | Apr. 14, 1925 |
| 2,730,772 | Jones | Jan. 17, 1956 |